(12) United States Patent
Sunay

(10) Patent No.: US 8,149,684 B1
(45) Date of Patent: Apr. 3, 2012

(54) CODE SPACE SHARING AMONG MULTIPLE MODES OF OPERATION

(75) Inventor: Mehmet Oguz Sunay, Summit, NJ (US)

(73) Assignee: Alcatel Lucent, Paris (FR)

( * ) Notice: Subject to any disclaimer, the term of this patent is extended or adjusted under 35 U.S.C. 154(b) by 2849 days.

(21) Appl. No.: 09/660,093

(22) Filed: Sep. 12, 2000

(51) Int. Cl.
*H04J 11/00* (2006.01)

(52) U.S. Cl. ......... 370/208; 370/210; 370/335; 370/342

(58) Field of Classification Search ............ 370/208, 370/209, 319, 320, 335, 342, 441
See application file for complete search history.

(56) References Cited

U.S. PATENT DOCUMENTS

| | | | | |
|---|---|---|---|---|
| 5,410,568 A | * | 4/1995 | Schilling | 370/342 |
| 5,751,761 A | * | 5/1998 | Gilhousen | 375/146 |
| 6,064,662 A | | 5/2000 | Gitlin et al. | 370/330 |
| 6,252,867 B1 | * | 6/2001 | Pfeil et al. | 370/335 |
| 6,937,559 B1 | * | 8/2005 | Kim et al. | 370/209 |

FOREIGN PATENT DOCUMENTS

WO    WO 9835514    *  8/1998

OTHER PUBLICATIONS

Ramakrishna, S. et al., "A Scheme for Throughput Maximization in a Dual-Class CDMA System", 1997 *IEEE 6th Intnl. Conference on Universal Personal Communication Record,* San Diego Oct. 12-16, 1997, IEEE International Conf. on Universal Personal Comm., New York, IEEE, US, vol. 2, Conf. 6, Oct. 12, 1997, pp. 623-627.
Azad, H. et al., "Multirate Spread Spectrum Direct Sequence CDMA techniques", *IEE*, London, GB, Apr. 15, 1994, pp. 4/1-4/5.
Oguz, S. et al., "Provision of Variable Data Rates in Third Generation Wideband DS CDMA Systems", *Wireless Communications and Networking Conference,* 1999., WCNC, 1999 IEEE New Orleans, La, USA Sep. 21-24, 1999, Piscataway, NJ, USA, pp. 505-509.

* cited by examiner

*Primary Examiner* — Bob Phunkulh
(74) *Attorney, Agent, or Firm* — Williams, Morgan & Amerson, PC

(57) ABSTRACT

The code space associated with the communication system is divided into at least two subspaces where each subspace is assigned to a different mode of operation. In one mode, such as a voice mode, each user is given full time access to a portion of the subspace associated with that mode of operation. In a second mode, such as a data mode, each user uses the entire subspace associated with that mode on a time shared basis.

10 Claims, 2 Drawing Sheets

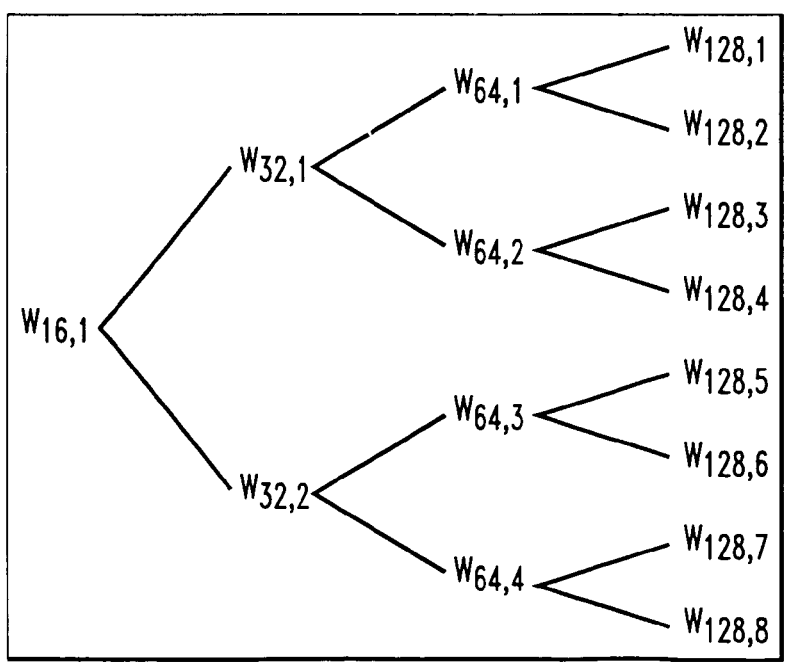

CODE SPACE SHARING AMONG MULTIPLE MODES OF OPERATION

RELATED APPLICATIONS

Related subject matter is disclosed in the following application filed concurrently herewith and assigned to the same assignee hereof: U.S. patent application entitled "Dynamic Reassignment of Code Space among Multiple Modes of Operation," Ser. No. 09/660,094.

BACKGROUND OF THE INVENTION

1. Field of the Invention

The present invention relates to communications; more specifically, wireless communications.

2. Description of the Related Art

In some wireless communication systems, channels are distinguished using orthogonal codes such as Walsh codes that are assigned from a collection of codes that constitute a code space. Typically each user is given full time access to a subspace of the code space such as one or more Walsh codes. This type of use of the code space is inefficient in multiple mode operations such as in systems supporting both voice and data users.

SUMMARY OF THE INVENTION

The present invention divides the code space associated with the communication system into two subspaces where each subspace is assigned to a different mode of operation. In one mode, such as a voice mode, each user is given full time access to a portion of the subspace associated with that mode of operation until the communication session is ended by, for example, a handoff, a dropped call or an end of call. In a second mode, such as a data mode, each user uses the entire subspace associated with that mode on a time shared basis.

BRIEF DESCRIPTION OF THE DRAWINGS

FIG. 1 illustrates Walsh matrices;

FIG. 2 illustrates a Walsh matrix of order 4;

FIG. 3 illustrates the derivation paths for different Walsh spaces;

DETAILED DESCRIPTION

Figure 4:
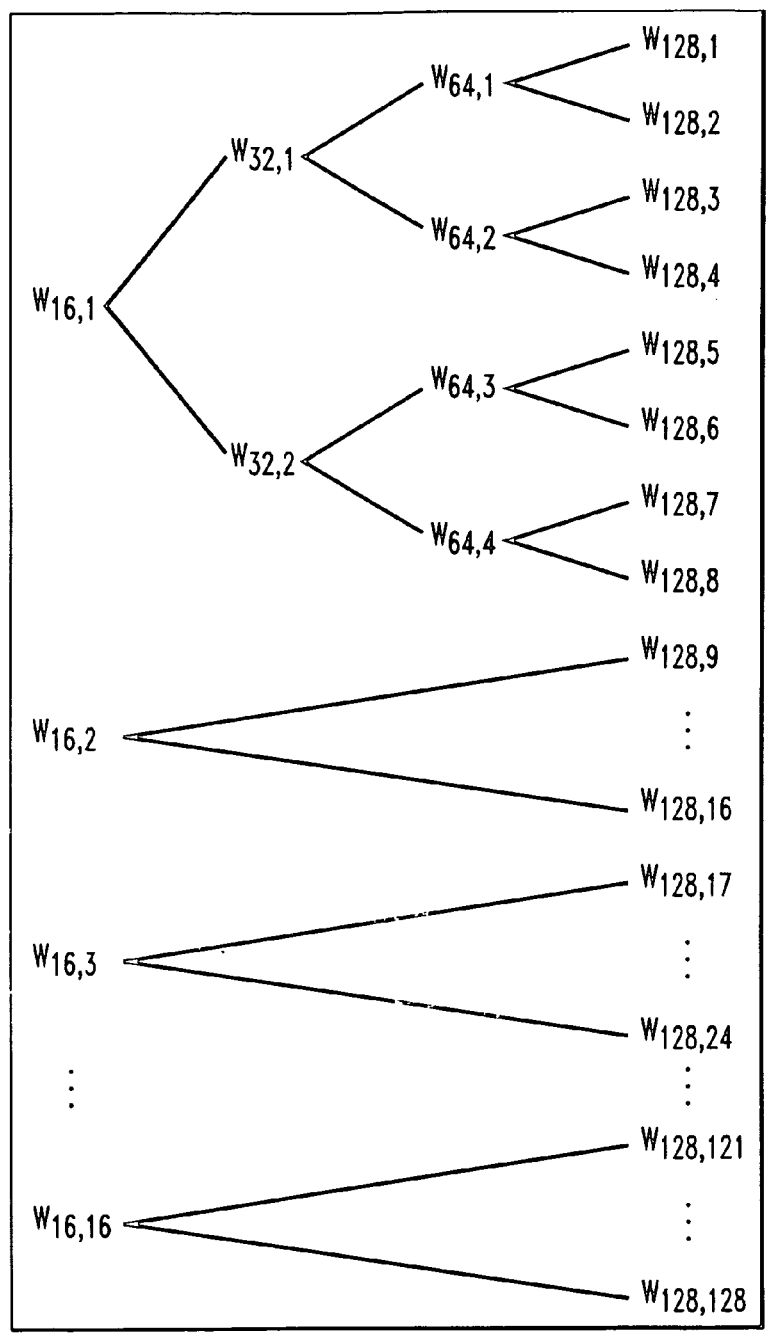
FIG. 4 illustrates the relationship between portions of a 128 Walsh code space.

Walsh codes have the distinctive property that higher Walsh space codes can be derived from the lower Walsh space codes.

FIG. 3 illustrates a Walsh matrix of order 1 and order 2, and a Walsh matrix of order 2n. The rows of the matrix are the Walsh codes composing the Walsh space. The relationship between a Walsh matrix of order n and order 2n is a recursive relationship and is used to easily produce larger order Walsh matrices. For example, in creating a Walsh matrix of order 4, the Walsh matrix of order 2 is inserted into the upper left hand corner, the upper right hand corner, and the lower left hand corner of the Walsh matrix of order 4. The bar version of the Walsh matrix of order 2 is inserted into the lower right hand corner of the Walsh matrix of order 4. The bar version of the matrix is formed by taking the logical inverse of each element of the matrix. FIG. 2 illustrates a Walsh matrix of order 4.

Orthogonality across codes from different spaces is possible as long as two codes that are in the same derivation path are not selected simultaneously. Consider FIG. 3. Here, a code from the Walsh space of Walsh-16 is used to derive two codes from the Walsh space of Walsh-32. Likewise, each Walsh code from the Walsh-32 space is used to create two codes from the Walsh-64 space and so on. In the figure $W_{x,y}$ represents the y'th Walsh code form the Walsh space of Walsh-x. Now, from the figure, one can see that, for example, while $W_{32,1}$ and $W_{64,3}$ are orthogonal, $W_{32,1}$ and $W_{64,2}$ are not.

When assigning code space to mode one users, such as voice users, and assigning other code space to mode two users, such as data users, it is desirable to divide the codes in large blocks that originate from a lower order Walsh code such as a 16 symbol code. By assigning the subspaces in groups originating from lower order Walsh codes, a receiver's design is simplified by requiring fewer decoding paths to receive transmissions. For example, in a system using 128 symbol Walsh codes, it is desirable to assign the codes to the subspaces in groups of 8 consecutive codes so that a receiver would only need 16 decoding paths to receive transmissions.

In reference to FIG. 4, an initial set of subspace assignments may be with $W_{128,1}$ through $W_{128,8}$ being assigned to mode 1 operations while the remaining Walsh codes are assigned to the mode 2 (Walsh codes $W_{128,9}$ through $W_{128,128}$). It should be noted that the code spaces have been divided into subspaces originating from 16 symbol Walsh codes which allows a receiver to use 16 decoding paths to receive transmissions. In the mode 1 subspace one or more codes are assigned to each user on a full time basis or until communications are complete with that user. In the mode 2 subspace, all of the codes are assigned to a single user on a time shared or time multiplexed basis. For example, each of n users may use the entire mode 2 code subspace for 1/n of the time.

It is also possible to distribute the codes among the mode 1 and mode 2 subspaces on a dynamic basis. For example, if one code in the mode 1 subspace is not being used, it may be assigned to the mode 2 subspace; however, this is subject to the code from the mode 1 subspace being orthogonal to all of the other codes in the mode 2 subspace. If more codes in the mode 1 subspace are unused, they may be assigned to the mode 2 subspace as well, but once again subject to the codes from the mode 1 subspace being orthogonal to all of the other codes presently in use in the mode 2 subspace. Similarly, unused codes in the mode 2 subspace may be assigned to the mode 1 subspace subject to the codes from the mode 2 subspace being orthogonal to all of the codes presently in use in the mode 1 subspace. Information regarding the current set of code assignments may be transmitted by a base station to users as well as other base stations using communication channels such as control channels or paging channels.

Figure 5:
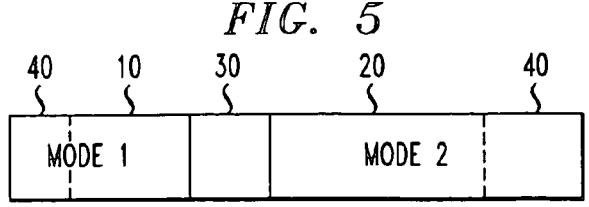
FIG. 5 illustrates the distribution of code space between two modes of operation.

FIG. 5 illustrates the distribution of codes between the mode 1 and mode2 subspaces. Portion 10 may be assigned to the mode 1 subspace while portion 20 is assigned to the mode 2 subspace. It should be noted that a guardband 30 is provided where codes are not assigned to either subspace. This guardband allows the mode 1 or mode 2 subspaces to expand without immediately removing a code from the other subspace. After some of the codes in the guardband are assigned to one of the subspaces, the guardband is expanded to its original size by taking codes from either subspace as they become available. Additionally, each of the code spaces may be assigned a minimum number of codes indicated by bands 40. These bands guarantee that each of the mode 1 and mode 2 subspaces always have a minimum number of codes for operation.

The invention claimed is:

1. A method for partitioning code space in a communication system, comprising the step of:

dividing a code space into at least two subspaces, where codes in the first subspace are assigned to at least one user for a voice communication session until the voice communication session of said at least one user is complete and where all of the codes in the second subspace are assigned to each of a plurality of users for data communication on a time-shared basis so that each of the plurality of users can use all of the codes in the second subspace at a same selected time interval.

2. The method of claim 1, wherein codes are dynamically assigned between the at least first and second subspaces.

3. The method of claim 2, wherein a minimum number of codes are provided to the first subspace.

4. The method of claim 2, wherein a minimum number of codes are provided to the second subspace.

5. The method of claim 2, wherein a plurality of codes are unassigned to a subspace and are available for assignment to either subspace.

6. A method for partitioning code space in a communication system, comprising the steps of:

dividing a code space into at least two subspaces, where codes in the first subspace are assigned to at least one user for a voice communication session until the voice communication session of said at least one user is complete and where all of the codes in the second subspace are assigned to each of a plurality of users on a timeshare basis for data communication so that each of the plurality of users can use all of the codes in the second subspace at a same selected time interval.

7. The method of claim 6, wherein codes are dynamically assigned between the at least first and second subspaces.

8. The method of claim 7, wherein a minimum number of codes are provided to the first subspace.

9. The method of claim 7, wherein a minimum number of codes are provided to the second subspace.

10. The method of claim 7, wherein a plurality of codes are unassigned to a subspace and are available for assignment to either subspace.

* * * * *